United States Patent [19]

Smiley et al.

[11] Patent Number: 4,619,766

[45] Date of Patent: Oct. 28, 1986

[54] BEVERAGE BREWINGS FILTERS, APPARATUS AND METHOD

[76] Inventors: Thomas B. Smiley; Christine L. Smiley, both of 5508 Doncaster Way, Edina, Minn. 55436

[21] Appl. No.: 780,250

[22] Filed: Sep. 27, 1985

Related U.S. Application Data

[63] Continuation of Ser. No. 602,936, Apr. 23, 1984, abandoned.

[51] Int. Cl.⁴ .............................................. B01D 23/28
[52] U.S. Cl. ...................................... 210/482; 99/306; 206/804; 210/493.5; 210/497.01
[58] Field of Search .................... 210/474, 482, 493.5, 210/497.01; 206/804; 99/295, 305, 306

[56] References Cited

U.S. PATENT DOCUMENTS

| | | | |
|---|---|---|---|
| 863,039 | 8/1907 | McGregor | 221/47 |
| 1,111,962 | 9/1914 | Hooper | 206/804 |
| 1,369,930 | 3/1921 | McCorkindale | 204/804 |
| 1,682,350 | 8/1928 | Ringler | 204/804 |
| 2,082,765 | 6/1937 | Krueger | 206/804 |
| 2,112,960 | 4/1938 | Harvey | 206/804 |
| 3,276,655 | 10/1966 | Manheim | 229/1.5 B |
| 3,418,916 | 12/1968 | Peirce | 99/305 |
| 3,695,167 | 10/1972 | Schmidt et al. | 99/306 |
| 3,779,415 | 12/1973 | Eddleman et al. | 215/248 |
| 3,800,954 | 4/1974 | Lampcov | 210/407 |
| 3,971,305 | 7/1976 | Daswick | 99/295 |
| 4,080,299 | 3/1978 | Bartolome | 210/482 X |
| 4,220,541 | 9/1980 | Chang | 210/474 |
| 4,271,024 | 6/1981 | Kawolics et al. | 210/474 |
| 4,362,623 | 12/1982 | Holopainen | 210/493.5 |

*Primary Examiner*—John Adee
*Attorney, Agent, or Firm*—Merchant, Gould, Smith, Edell, Welter, and Schmidt

[57] ABSTRACT

A nested stack of bowl-like disposable beverage brewing filter sheets. Each filter sheet has two adjacent folds in opposite direction forming a grippable strip for removing discrete sheets from the stack. A container for the nested stack has a removable panel for exposing the grippable strip of the outermost sheet for easy finger gripping and discrete removal of the sheet. The container is slideably receivable in a bracket adapted to hold it as a dispenser. Refillable dispensers are also disclosed.

A method for preparing a beverage brewing apparatus for brewing comprises the steps of grasping with fingers of one hand the strip of the outermost filter sheet at a location other than at the edge of the sheet, pulling the filter sheet as a discrete entity from the stack, and lining the brewing basket with the single filter sheet in preparation for brewing.

14 Claims, 12 Drawing Figures

BEVERAGE BREWINGS FILTERS, APPARATUS AND METHOD

This FWC application is a continuing application or continuation application of the prior application above identified, namely Ser. No. 602,936, filed Apr. 23, 1984 abandoned.

FIELD OF THE INVENTION

The present invention relates to disposable beverage brewing filter sheets. More particularly, the invention relates to a nested stack of filter sheets having special folding which forms a grippable strip. Additionally the invention includes a packaging arrangement for such filter sheets, as well as a bracket for holding the package or container as a dispenser for the sheets. Further includes is a refillable dispenser. Still further, the invention embraces a new method for preparing a beverage brewing apparatus for brewing.

The automatic drip coffee maker has become the common beverage brewing apparatus for home and commercial usage in preparing coffee. The apparatus specifically includes a basket lined with a disposable filter to contain ground coffee, tea or the like and supported so as to permit hot water to be run through the coffee in the basket, a lower vessel for collecting the brewed coffee as it drains from the basket, a warmer plate beneath the lower vessel, and a means for adding hot water to the upper basket. Such coffee makers are marketed for home use under various trade names, e.g., Mr. Coffee, manufactured by North American Systems Incorporated of Bedford Heights, Ohio, or Bunn, manufactured by Bunn-o-Matic Corporation of Springfield, Ill.

The filter sheets required for such coffee makers are generally marketed in nested stacks which has posed a problem for the consumer or user in separating individual filter sheets from the stack for use. The problem arises from the clinging of individual sheets to each other within the stack. Conventionally, the use of two hands is required to separate a single end filter sheet from the stack; and fingernail insertion at the exposed edge of the sheets of the stack is commonly used. This effort requires exposing and handling the entire nested stack and furthermore, may still be unsuccessful for separating a single filter sheet.

Heretofore all known attempts for solving the foregoing problem have dealt with edge treatment, that is, addition or creation of a structure at the edges per se of the filter sheets. Such approach conforms to that which experience has taught, namely, the edge insertion of a fingernail for separation of a sheet from the stack. Not only are edge treatments or structures economically unfeasible from a manufacturing standpoint, they also require the user or consumer to visually inspect and locate the edge structure as a preliminary to the separation step.

SUMMARY OF THE INVENTION

The present invention provides an entirely new approach for the separation of discrete filter sheets from a nested stack, namely an approach which does not rely upon attacking the problem by concentrating on edges of the sheets. Indeed, the approach of the invention permits quick and reliable separation of a single sheet from a nested stack without requiring the use of two hands and without the necessity for visual inspection of details of the nested stack. It provides a nested stack of disposable beverage brewing filter sheets that are easily separable and economically feasible to manufacture.

Further provided is a container for the nested stack which protects the stack and is convertible to a dispenser which facilitates the removal of individual filter sheets at will.

Further provided is a long life reuseable bracket to hold the package in a desirable spacial locale and facilitate removal of individual filter sheets from the package.

The invention also embraces, as a preferred option, a refillable fixture having dispenser features.

Still further the present invention provides a method for preparing a beverage brewing apparatus for the brewing operation, conveniently and more quickly than is presently known.

An especially preferred feature of the invention is a nested stack of bowl-like disposable beverage brewing filter sheets. Each preferred filter sheet has two substantially parallel adjacent folds in opposite direction relative to each other. The folds are preferably sharp creases that generally lie flat and do not interlock with other sheets in the stack. The folds form a grippable strip (e.g., a pleat) for single hand grasping to pull and remove a single sheet from the stack.

The nested stack may be packaged or placed in a container that has a removable panel. Removing the panel provides an opening for grasping of the strip, e.g., as at the bottom wall of an end filter sheet, without the necessity of visually locating the strip. The container is slideably receivable by a holding bracket, which may be mounted in a desirable locale, such as on a wall, under a cupboard or on or under a countertop near a coffee maker. The bracket allows access to the container's opening and reliable single hand removal of an individual filter sheet. For bulk size quantities of filter sheets, the nested stack may be marketed in a plastic or paper bag and placed by the user in a refillable dispenser.

With the foregoing constructions and arrangements, a new method is provided for preparing a beverage brewing apparatus for brewing, wherein single hand removal of discrete filter sheets from a nested stack comprises the key step.

DESCRIPTION OF THE PREFERRED EMBODIMENT

Figure 1:
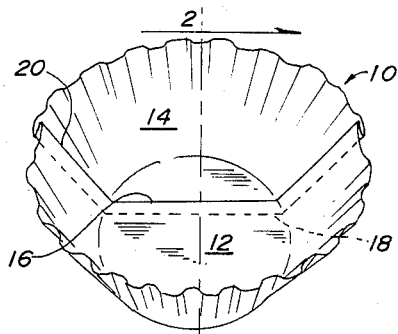
FIG. 1 is a perspective view of one filter sheet according to the invention.
Figure 2:
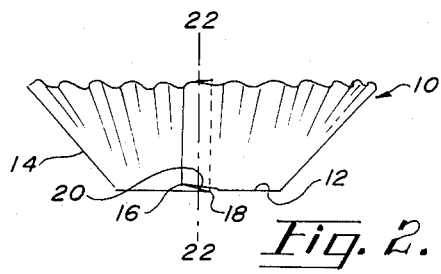
FIG. 2 is a schematic cross section along lines 2—2 of FIG. 1.

Refering first to FIGS. 1 and 2, the filter sheet, generally indicated by numeral 10, may be made of paper or any other suitable material having a porous nature. The sheets have a bowl-like shape with a bottom wall 12 and a side wall 14 that is corrugated, such as by vertical striations, flutings, folds, or the like. The dimensions of any filter sheet 10 are suitably determined by various brewing basket size and shape characteristics. That is, the filter sheets may be round, square, oval or of other configuration. In addition, the filter sheets may be large or small.

A first fold 16 is made generally near or along a bisecting or a center diameter line across a sheet. This fold 16 lies transversely to a vertical axis 22 such as shown by a dash line in FIG. 2. Fold 16 is in the form of a creased edge. A second crease or fold 18, in opposite direction relative to fold 16, is made in substantial proximity or near first fold 16 and preferably parallel to it. Fold 18 is in the form of a creased edge similar to fold 16. The folds generally lie flat so that the sheet material adjacent the folds lies upon the folds. For clarity of illustration, however, the attached figures show the folds slightly open or raised. The folds 16 and 18 form a grippable strip 20 of Z-shaped transverse cross section.

Figure 4:
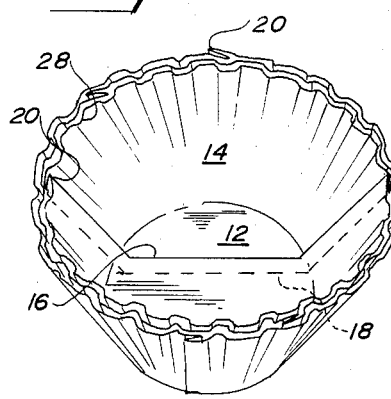
FIG. 4 is a perspective view of the nested stack.
Figure 3:
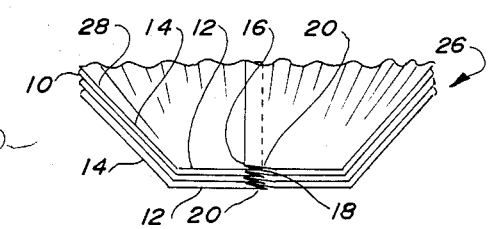
FIG. 3 is a schematic cross section of a nested stack.
Figure 6:
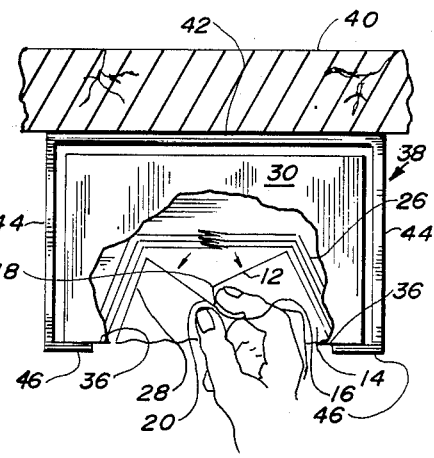
FIG. 6 is a schematic cross section of a mounted bracket, with the container in the bracket, the container being shown partially cut away to expose the nested stack and an end filter in an early stage of being removed therefrom by fingers.

The strip 20 functions as a grippable strip. A fingertip or fingernail can easily be inserted under a fold, without the need for visual inspection. The fold is easily pinched between fingertips for removing the sheet 10 from a nested stack 26 such as shown in FIGS. 3 and 4. The pinching of the strip 20 is easily accomplished at any point along the strip including, as preferred, the portion of the strip in the bottom wall 12, as shown in FIG. 6. It is this feature which for the first time allows discrete filter sheet removal from a nested stack in a manner readily overcoming the tendency of the sheets to cling to each other and without any handling of ther sheets of the stack.

Either fold 18 or 20 may be made first. The respective folds are preferably 0.5 cm to 1.5 cm (¼ to ½ inch) from each other. Grippable strips 20 may be formed in filter sheets 10 by folding machinery before or after the sheets are individualized by cutting from a roll of filter sheet material or the like. However, the strips are preferably formed before the sheets are formed into their bowl-like shape.

As shown in FIGS. 3 and 4. the stack 26 has a solid bowl-like shape with its wall thickness dependent on the number of filter sheets in the stack. The sheets are nested snugly within one another with all surfaces, except for the exposed surface ends of the stack, in contact with each other. The folds (i.e., grippable strips 20) of adjacent sheets of the stack are not interlocked. However, the corrugated-type shape of the side walls contributes to the sidewall corrugated interlocking between the filter sheets. Any attempt to remove a single filter sheet is hampered by the sheets clinging to each other.

In this invention, however, separation of an individual filter sheet from the stack begins from bottom wall 12 and not from an edge of an end filter sheet 28, as the invention is preferably practiced. The grippable strip 20 in end filter sheet 28 is readily accessible within the cavity recess of the stack. By preferably gripping and pulling strip 20 with fingertips at bottom wall 12 within the cavity recess end of the stack, the breaking or peeling away of the end filter sheet 28 from stack 26 begins in the center of the filter sheet and radiates outward uniformly peeling the end filter sheet away from side walls 14 of the nested stack. This is an especially interesting feature of the invention, since the clinging effect between the sheets is least between the flat bottom walls 12 and greatest between the interlocked and corrugated walls 14 within the nested stack 26.

Figure 5:
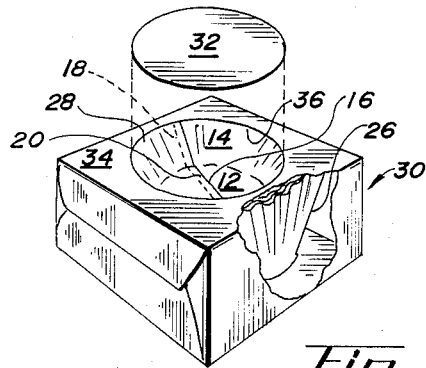
FIG. 5 is a perspective view of a package comprising a container convertible to a dispenser, illustrated with its access panel removed and a portion of the container partially cut away to expose the nested stack within the container.

One preferred packaging arrangement for the nested stack as shown in FIG. 5 has a container 30, which is of a size slightly larger than the stack. The container encloses the nested stack 26 and is designed to carry the stack with minimum volume space requirements and to protect the nested stack from crushing in shipment and storage. It may be made of cardboard, plastic, stainless steel or any suitable rigid material. A removable access panel 32 in wall 34 of the container opposes the interior bottom wall 12 in the cavity recess of the stack. The periphery or outline of panel 32 may be scored, perforated or otherwise weakened to form a line of severance about it so as to facilitate its removal. Upon removal of access panel 32, this novel arrangement allows access of fingers through opening 36 for gripping strip 20 in bottom wall 12 of end filter sheet 28 in the cavity recess of the stack without removal of the stack from the container. Preferably by this arrangement, the nested stack is never removed from container 30, thus insuring cleanliness of the filter sheets and no handling of those sheets not immediately needed for brewing purposes. The preferable size of opening 36 should be adequate to allow comfortable insertion of fingertips to grasp a grippable strip 20 for removal of a single filter sheet, but at the same time inadequate for removal of the stack. Remainder of wall 34 provides the means for holding and supporting the nested stack at its edges within the container as solely end filter sheet 28 is pulled and removed.

Bracket 38, as illustrated in FIG. 6, is mounted under a cabinet 40 by adhesives or conventional screws and has an elongated configuration, generally C-shape in cross section. Opposing side walls 44 extend from base wall 42 and have inwardly extending lips 46 at their opposing edges from base wall 42. Bracket 38 may have a stop member or back wall to restrict movement of container 30 as it is inserted in bracket 38 and thus prevent container 30 from sliding through the bracket. The bracket is preferably made of plastic, metal or any other relatively rigid material so as to be sturdy and have a long and reuseable life. Base wall 42 may be mounted on a desirable surface, such as a wall, under or on a countertop, cabinet, cupboard or the like. Container 30 is slideably received into bracket 38 and held by opposing side walls 44 and supported by inwardly extending lips 46. Preferably, opening 36 of container 30 is not obstructed by the lips 46 so as to insure easy finger access within the container. Dimensions of bracket 38 are dependent upon the dimensions of container 30, which may also vary for different filter sheet configurations. The preferred bracket orientation holds container 30 so that opening 36 is facing downward to keep dust and air particles from settling upon the exposed end filter sheet and thus futher contribute to the keeping of the nested stack clean.

In operation, fingers, such as a thumb and forefinger, reach inside the opening of the container or dispenser. Because the strip preferably runs across the center of bottom wall 12, a fingertip simply feels for fold 16 of grippable strip 20 and grasps such strip with fingertips or fingernails. Strip 20 is then pulled, removing the end filter sheet from the nested stack.

Once a single filter sheet has been obtained, it may be inserted within the brewing basket with strip 20 (folds 16 and 18) intact, or the sheet may be stretched out to remove or flatten the folds 16 and 18 and thereby remove the grippable strip. If folds 16 and 18 are to be removed from bottom wall 12, the bowl-like shape may be oval in overall configuration if desired, so as to allow for expansion into a round bowl-like shape before insertion into a round brewing basket. The filtration process however, will not be hampered by leaving strip 20 intact.

Figure 7:
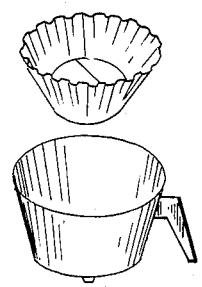
FIG. 7 is a exploded perspective view of major elements of a beverage brewing apparatus having the filter of the invention.
Figure 7:
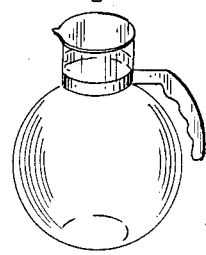

Using the new constructions and arrangements aforediscussed, an improved method for preparing a brewing apparatus for brewing, as shown in FIG. 7, with a speed and convenience not heretofore realized, includes the steps of removing a single filter sheet 10 from a nested stack 26 by inserting fingers of one hand into container 30 about the stack to grasp strip 20 at a location other than at the edge of the sheet, pulling strip 20 with fingertips to remove a single filter sheet 10 from the stack 26 without disturrbing or touching the other sheets within the stack, and lining the brewing basket with the removed single filter sheet.

Figure 9:
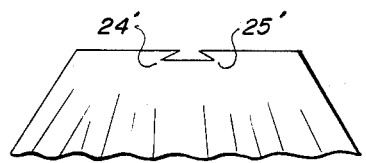
FIG. 9 is a schematic cross section of another modified form.
Figure 8:
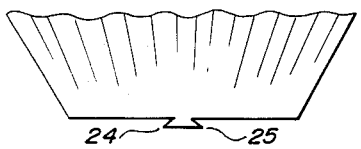
FIG. 8 is a schematic cross section of a modified form of filter sheet according to the invention.

The present invention may be embodied in other specific forms without departing from the spirit or essential attributes thereof. More than one grippable strip may be placed in the filter sheet. For example, variations as shown in FIGS. 8 and 9 may have the strips 24 and 25, or 24'0 and 25', in converse or mirror image relationship extending away from the recess cavity or toward the recess cavity respectively. In effect, a single grippable strip of dove tail configuration in transverse cross section may be employed. Further, folds 16 and 18 forming strip 20 may be made along a line or section of a sheet other than at a bisecting or center diameter line across the sheet. Additionally, the folds need not be perfectly parallel to each other. In still another variation, strips 20 may or may not be nested in parallel alignment to each other within the stack. They may be randomly oriented, or aligned, as desired, as shown in FIGS. 3 and 4.

Figure 10:
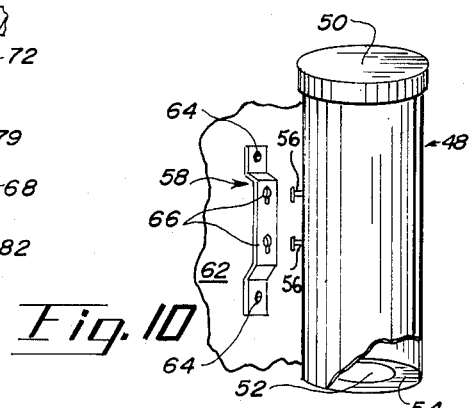
FIG. 10 is a horizontally exploded perspective view of a mounting means and a cylindrical dispenser of the invention, the dispenser being partially cut away to show an opening in the bottom wall.

Commercial users of brewing apparatuses prefer purchasing bulk quantities of filter sheets. Such quantities of the nested stacks of this invention may be packaged and marketed in plastic or paper bags. FIG. 10 illustrates one variation of a permanent fixture that takes the form of a refillable cylindrical dispenser 48 with a removeable cap 50 to allow access into the cylinder for loading nested stacks therein. Cap 50 alternatively may be hingedly attached to cylinder 48. Opening 52, in bottom wall 54, is preferably similar to opening 36 of container 30. The dispenser is suitably made of relatively rigid material, such as plastic or metal. Dispenser 48 has preferably 2 vertically aligned capped pins or knobs 56 outwardly extending from its side wall. Bracket 58 is preferably of rigid material and is attached to a mounting surface 62, such as a wall, with screws 64. It has matching key hole slots 66 for receiving the corresponding capped pins 56 as the mounting points for refillable cylindrical dispenser 48.

Figure 11:
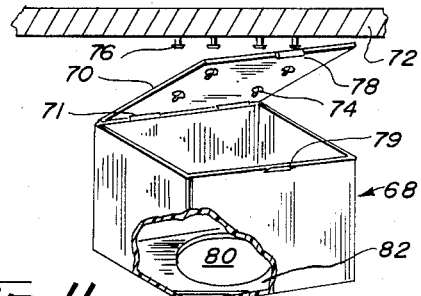
FIG. 11 is a vertically exploded perspective view of a mounting means and a refillable dispenser, the dispenser being partially cut away to show an opening in the bottom wall.

Dispenser 68, as shown in FIG. 11, is another variation of a permanent refillable dispenser. It is box-shaped in configuration with its top wall or cover 70 hinged at 71 and mounted under a surface 72 in a manner comparable to the key hole slot 74 and capped pin 76 arrangement used in mounting the cylindrical dispenser 48. However, other mounting arrangements may be employed; and adhesive mounting is suitable. Top wall 70 and box part 68 have co-acting clasp components 78 and 79 for fastening together and thus holding dispenser 68 in a closed position. Upon disengagement of the clasp, dispenser part 68 swings downwardly to allow access for loading nested stacks therein. Opening 80, in bottom wall 82, is comparable to opening 36 of container 30.

Figure 12:
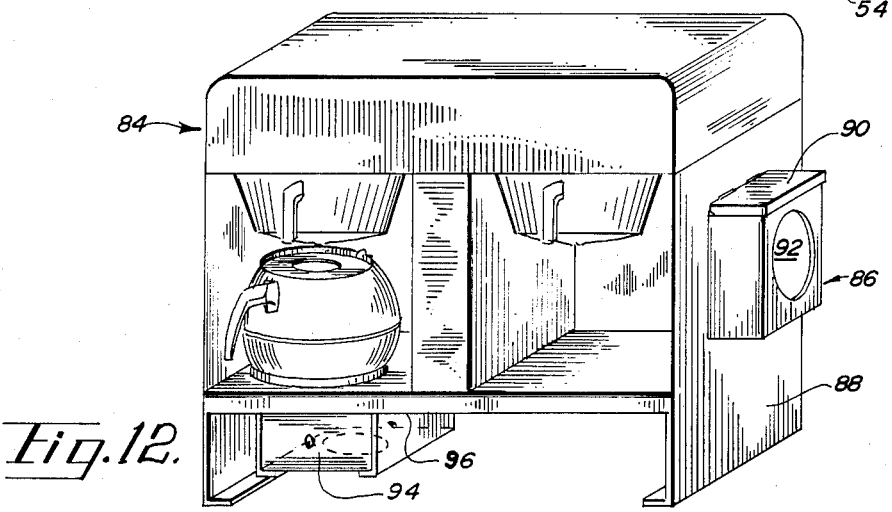
FIG. 12 is a perspective view of a brewing apparatus having two alternative forms of refillable dispensers for filter sheets of the invention, one dispenser being on a side panel and another mounted below a base panel.

A commercial brewing apparatus 84, as shown in FIG. 12, is preferably equipped with a permanent refillable dispenser 86 mounted on the brewing apparatus itself, such as on a side wall 88. Dispenser 86 has a hinged top wall 90 for providing access within the dispenser to load nested stacks therein. Similarly, opening 92 provides access for removal of discrete filters from the stack. Another variation of a dispenser embraced by this invention is a drawer 94 which is held by cooperative side parts at the juncture between the drawer and bottom panel 96 of the apparatus. Pulling drawer 94 outwardly allows access for loading nested stacks therein. An opening in its bottom wall provides for discrete removal of filters from the stack.

The illustrated embodiments should be considered in all respects as illustrative and not restrictive, reference being made to the appended claims rather than to the foregoing description to indicate the scope of the invention.

What is claimed is:

1. In a disposable beverage brewing filter of the type including a bowl-like shaped sheet of porous material having a flat bottom wall and a surrounding corrugated side wall defining an open end for receiving coffee, tea or the like to be brewed, the improvement comprising:
the bottom wall of said sheet including a fold therein of predetermined, non-interlocking configuration with opposing generally parallel flap portions extending across the bottom wall to define a transverse integral strip to facilitate manual separation and removal of individual filters from a nested stack thereof.

2. A disposable beverage brewing filter, comprising:
a sheet of suitable porous material;
said sheet being formed into a bowl-like shape having a bottom wall defining a closed end, and a surrounding side wall with an upper edge defining an open end with a cavity recess therein for receiving coffee, tea or the like to be brewed;
said sheet including a non-interlocking fold of predetermined configuration extending across at least the bottom wall thereof to define a transverse integral strip for facilitating manual separation and removal of individual filters from a nested stack thereof.

3. The filter of claim 2, wherein said sheet of porous material is comprised of paper.

4. The filter of claim 2, wherein the side wall of said sheet is corrugated.

5. The filter of claim 2, wherein the fold is substantially straight and also extends through portions of the side wall between opposite points on the upper edge of said sheet.

6. The filter of claim 2, wherein the fold is of Z-shaped transverse cross-section with parallel fold portions extending from opposite sides of the bottom wall of said sheet.

7. The filter of claim 2, wherein the fold is of dovetail-shaped transverse cross-section with parallel fold portions extending from opposite sides of the bottom wall of said sheet.

8. Dispenser apparatus, comprising:
   a container having opposite ends, one end being closed and the other end including an access opening of predetermined size therein;
   a nested stack of disposable beverage brewing filters located within said container;
   each filter being formed from a sheet of suitable porous material into a bowl-like shape having a flat bottom wall defining a closed end, and a surrounding corrugated side wall with an upper edge defining an open end with a cavity recess therein for receiving coffee, tea or the like to be brewed;
   the upper edges of said filters being oriented toward the open end of said container, with the open ends of said filters being relatively larger than the access opening in the open end of said container so that said nested stack of filters is normally retained within said container; and
   each filter including a fold therein of predetermined non-interlocking configuration with opposing generally parallel flap portions extending across the bottom wall of the respective sheet to define a transverse integral strip reachable through the access opening in said container to facilitate individual manual separation and removal of each endmost filter therefrom.

9. The dispenser apparatus of claim 8, wherein said sheets of porous material are comprised of paper.

10. The dispenser apparatus of claim 8, wherein the fold is substantially straight and also extends through portions of the side wall between opposite points on the upper edge of said sheet.

11. The dispenser apparatus of claim 8, wherein the fold is of Z-shaped cross-section with flap portions extending from opposite sides of the bottom wall of said sheet.

12. The dispenser apparatus of claim 8, wherein the fold is of dovetail-shaped cross-section with flap portions extending from opposite sides of the bottom wall of said sheet.

13. The dispenser apparatus of claim 8, further including:
    an openable cover in the end of said dispenser opposite the end including the access opening, to facilitate refill of said filters; and
    means for securing said dispenser to a mounting surface.

14. The dispenser apparatus of claim 8, further including:
    a removable panel disposed in the access opening of said container.

* * * * *